A. QUICK & B. E. BAKER.
FRUIT PICKER.
APPLICATION FILED OCT. 1, 1913.
1,088,295.
Patented Feb. 24, 1914.
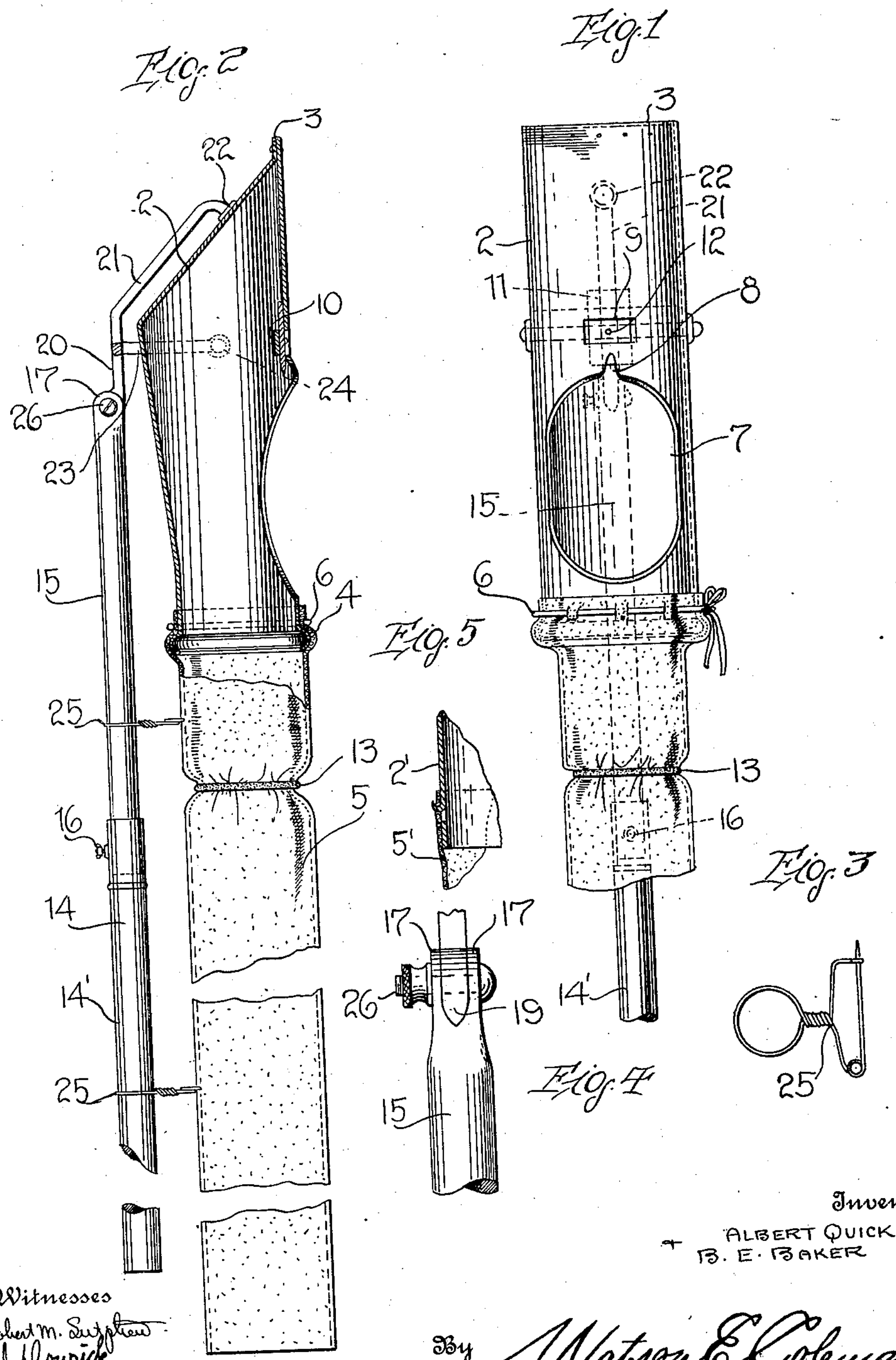
Witnesses
Robert M. Sutphen
V. J. Dowrick.
Inventors
ALBERT QUICK.
B. E. BAKER
By Watson E. Coleman
Attorney

UNITED STATES PATENT OFFICE.

ALBERT QUICK AND BURLEY E. BAKER, OF ATWOOD, ILLINOIS.

FRUIT-PICKER.

1,088,295. Specification of Letters Patent. Patented Feb. 24, 1914.

Application filed October 1, 1913. Serial No. 792,786.

*To all whom it may concern:*

Be it known that we, ALBERT QUICK and BURLEY E. BAKER, citizens of the United States, residing at Atwood, in the county of Piatt and State of Illinois, have invented certain new and useful Improvements in Fruit-Pickers, of which the following is a specification, reference being had to the accompanying drawings.

This invention relates to new and useful improvements in fruit pickers and more particularly to fruit pickers of the class operated by hand, the object of the invention being to provide a fruit picking device whereby fruits of various kinds may be readily removed from the trees and deposited in a suitable receptacle without bruising or crushing the same in any manner, the fruit being clipped from the tree and dropped into a flexible chute where it is conveyed to any form of receptacle.

Another object of the invention is the provision of a fruit picking device of the above character which will possess advantages in points of efficiency and durability, is inexpensive to manufacture and at the same time is simple in construction and operation.

With the above and other objects in view, this invention consists in the novel features of construction and the combination and arrangement of parts to be hereinafter more fully described, pointed out in the claim and shown in the accompanying drawings, in which—

Figure 1 is a front elevation of a fruit picking device constructed in accordance with our invention; Fig. 2 is a side elevation, parts being shown in vertical section; Fig. 3 is a front elevation of one of the clamping members carried by the handle; Fig. 4 is a side elevation illustrating the relation with the clamping members; Fig. 5 is a detail sectional view of the hood illustrating a slightly modified form of securing means for the flexible chute.

Referring more particularly to the drawings, 1 indicates the hood which is preferably circular in form and constructed of sheet metal or any other suitable material of this character. The top of the hood is closed by having a portion of the back thereof extending upwardly beyond the top and then bent inwardly upon an angle, as shown at 2, and having its upper end riveted or otherwise secured to the upper end of the front portion of the hood, as shown at 3. Formed upon the lower end of the hood 1 is a beading 4 upon which the upper end of the flexible chute 5 is mounted, the upper end of the chute extending upwardly beyond the beading and the cord 6 is provided which is engaged over the upper end of the chute to securely hold the same in position. The cord 6 may be formed of any suitable elastic material or may be formed of cotton and drawn sufficiently tight so as to engage the end of the chute with the hood.

The hood 1 is provided upon its front face thereof with an opening 7 which in the present instance is shown as oval in form and through which the fruit is adapted to be inserted into the hood. The hood is further provided at the upper end of the oval shaped opening 7 with a tapering notch 8 which is adapted to receive the stem of the fruit to be clipped. The hood 1 is provided above the tapering notch 8 with the spaced parallel transverse slits 9 and the material between said slits is bent inwardly, as shown at 10. Arranged between the transverse piece 10 and the outer wall of the hood is a knife blade 11, the cutting edge of which is disposed at the rear of the notch 8, said blade being securely held in position by means of a rivet 12 which passes through the knife blade and through the cross piece 10. From this it will be seen that by having the cutting edge of the knife blade 11 arranged adjacent the notch 8, the stems which are received in the notch may be readily severed so that the fruit will drop into the flexible chute 5.

The chute 5 is provided at intervals with flexible bands 13 which encircle the chute and press inwardly, as clearly illustrated in Fig. 2, so that the passage of the fruit through the chute will be retarded sufficiently to prevent bruising or crushing of the same as it enters the receptacle beneath the chute. The hood 1 is supported and is to be raised and lowered by means of an adjustable handle member 14, said handle comprising a main portion 14′ which is in the form of a tubular member and the upper portion 15 which is adjustably mounted within the portion 14′ and is securely held in various adjusted positions by means of the set screw 16. The upper end of the adjustable member 15 is provided with spaced circular portions 17, adapted to be arranged upon opposite sides of the plate 19 formed upon the lower end of the rod 20. The rod 20 extends upwardly at an angle, as shown at 21, and is secured at its extreme upper end to the top of the hood, as shown at 22.

Extending outwardly from opposite sides of the rod 20 are the arms 23, the ends of which extend inwardly and are secured to the sides of the hood, as shown at 24, so that when the handle member 14 has been raised and lowered, the hood 1 will be carried thereby. Mounted upon the handle member 14 and arranged in spaced relation are the pins 25 which are adapted to engage the flexible chute 5 to retain the same in spaced relation with the handle member and also to support the same in its upright position. It will be apparent that by providing the plates 17 and 19 and having them retained in various adjusted positions by means of the set screw 26, the hood may be readily disposed at various angles with respect to the handle member so that the fruit may be readily obtained from the tree.

From the above description taken in connection with the accompanying drawings, it will be readily apparent that we have provided a simple and durable fruit picker whereby various kinds of fruits may be readily severed from the tree and deposited in a suitable receptacle beneath the same without injuring or bruising the fruit.

In the operation of the device, the fruit which is to be picked from the tree is first inserted through the opening 7 into the hood 1, the hood is then pulled downward until the stem of the fruit is engaged within the notch 8 so that farther downward movement on the part of the hood will engage the cutting edge of the knife blade 11 with the stem of the fruit and sever the same, the fruit dropping downwardly through the flexible chute into any suitable receptacle placed below the same.

In Fig. 5, we have illustrated a slightly modified form of securing means for the upper end of the flexible chute. In this form of the invention, the lower end of the hood is provided with a plurality of struck out portions, the outer ends of which are tapered and curved upwardly to form hook members, upon which the upper end of the flexible chute is to be engaged, as clearly illustrated in the above mentioned figure.

While we have shown and described the preferred form of our invention, it will be obvious that various changes in the details of construction and in the proportions may be made without sacrificing any of the novel features or departing from the scope of the appended claim.

What we claim is:—

A device of the class described including a hood, an adjustable handle member secured to said hood, a flexible chute suspended from the lower end of the hood, said hood being provided upon one side thereof with an opening and further provided with a tapering notch communicating with said opening, said hood being provided above the opening with spaced slits, the material between said slits being bent inwardly into the body of the hood, a knife blade arranged between said material and the body of the hood, and a cutting edge formed on said knife blade and arranged adjacent the tapering notch, as and for the purpose set forth.

In testimony whereof we hereunto affix our signatures in the presence of two witnesses.

ALBERT QUICK.
BURLEY E. BAKER.

Witnesses:
JOHN W. DOTY,
C. E. MORRISON.

Copies of this patent may be obtained for five cents each, by addressing the "Commissioner of Patents, Washington, D. C."